(12) United States Patent
Kawanobe et al.

(10) Patent No.: US 6,178,699 B1
(45) Date of Patent: Jan. 30, 2001

(54) OPEN/CLOSE CONTROL SYSTEM FOR A VEHICLE SLIDE DOOR

(75) Inventors: Osamu Kawanobe; Ryoji Shimura, both of Kanagawa (JP)

(73) Assignee: Ohi Seisakusho Co., Ltd., Kanagawa (JP)

( * ) Notice: Under 35 U.S.C. 154(b), the term of this patent shall be extended for 0 days.

(21) Appl. No.: 09/048,281

(22) Filed: Mar. 26, 1998

(30) Foreign Application Priority Data

Mar. 31, 1997 (JP) .................................................. 9-094500

(51) Int. Cl.$^7$ ...................................................... E05F 15/20
(52) U.S. Cl. .................................................. 49/360; 49/31
(58) Field of Search .............................. 49/360, 361, 362, 49/31

(56) References Cited

U.S. PATENT DOCUMENTS

| | | | |
|---|---|---|---|
| 4,916,861 | * 4/1990 | Schap | 49/360 |
| 5,069,000 | * 12/1991 | Zuckerman | 49/360 |
| 5,263,762 | 11/1993 | Long et al. | 296/146.4 |

FOREIGN PATENT DOCUMENTS

A1 40 06 577   9/1990 (DE) .

* cited by examiner

*Primary Examiner*—Daniel P. Stodola
*Assistant Examiner*—Curtis A. Cohen
(74) *Attorney, Agent, or Firm*—Sughrue, Mion, Zinn, Macpeak & Seas, PLLC

(57) ABSTRACT

An open/close control system for a vehicle slide door includes in one embodiment, a drive source, e.g., a motor, a slide door opening/closing mechanism, a clutch for transmitting a drive force of the drive source to the opening/closing mechanism interruptively, movement signal generator for generating a signal dependent on the moving direction of the slide door, and slide door controller for controlling the drive force to be transmitted to the opening/closing mechanism by controlling the drive source and the clutch. The slide door controller stops the operation of the drive source and thereby stops the slide door, declutches the clutch to allow the slide door to be movable, detects a movement of the slide door caused by its weight by use of an output signal of the movement signal generator, and determines an inclination of the vehicle on the basis of the detection result.

16 Claims, 16 Drawing Sheets

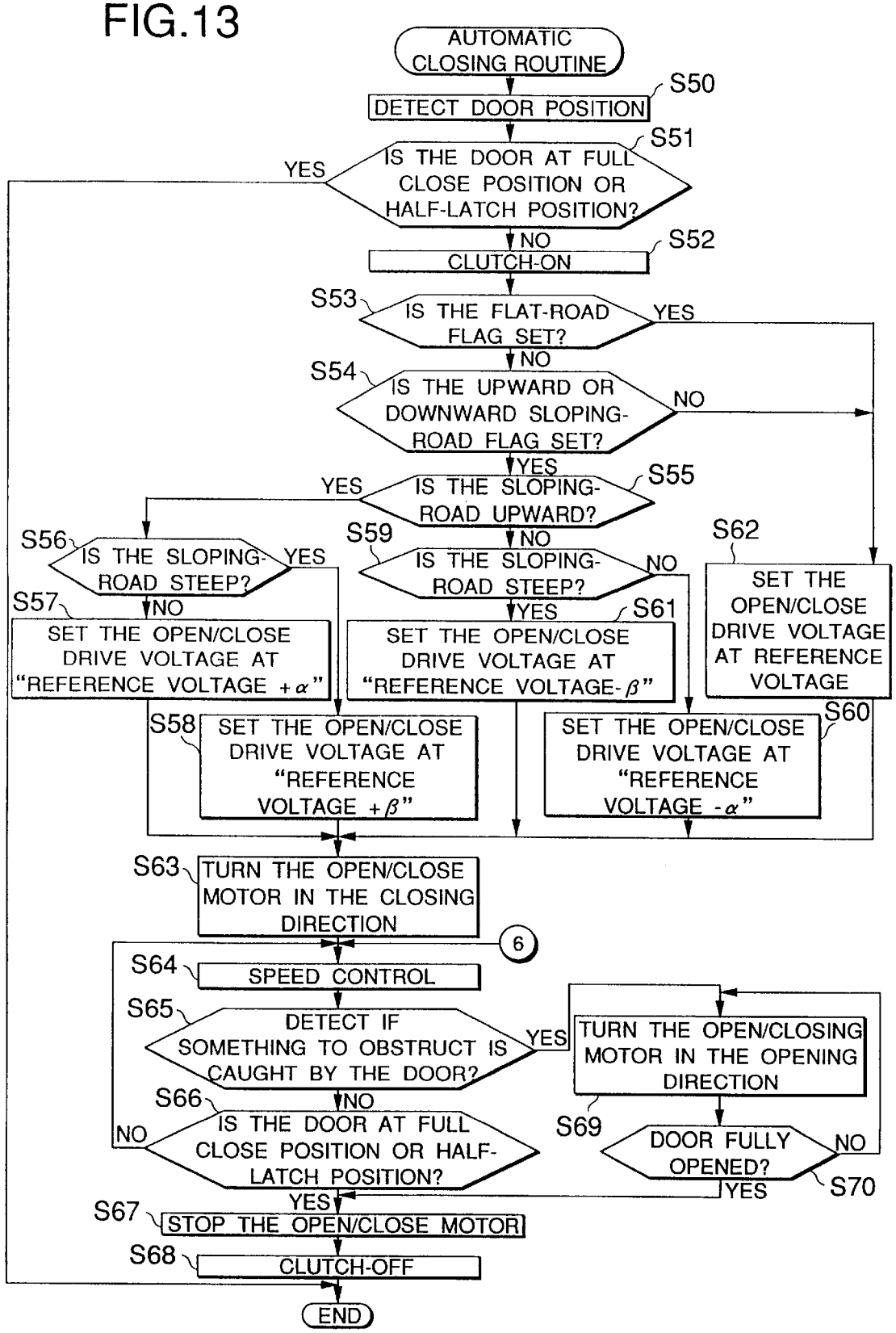

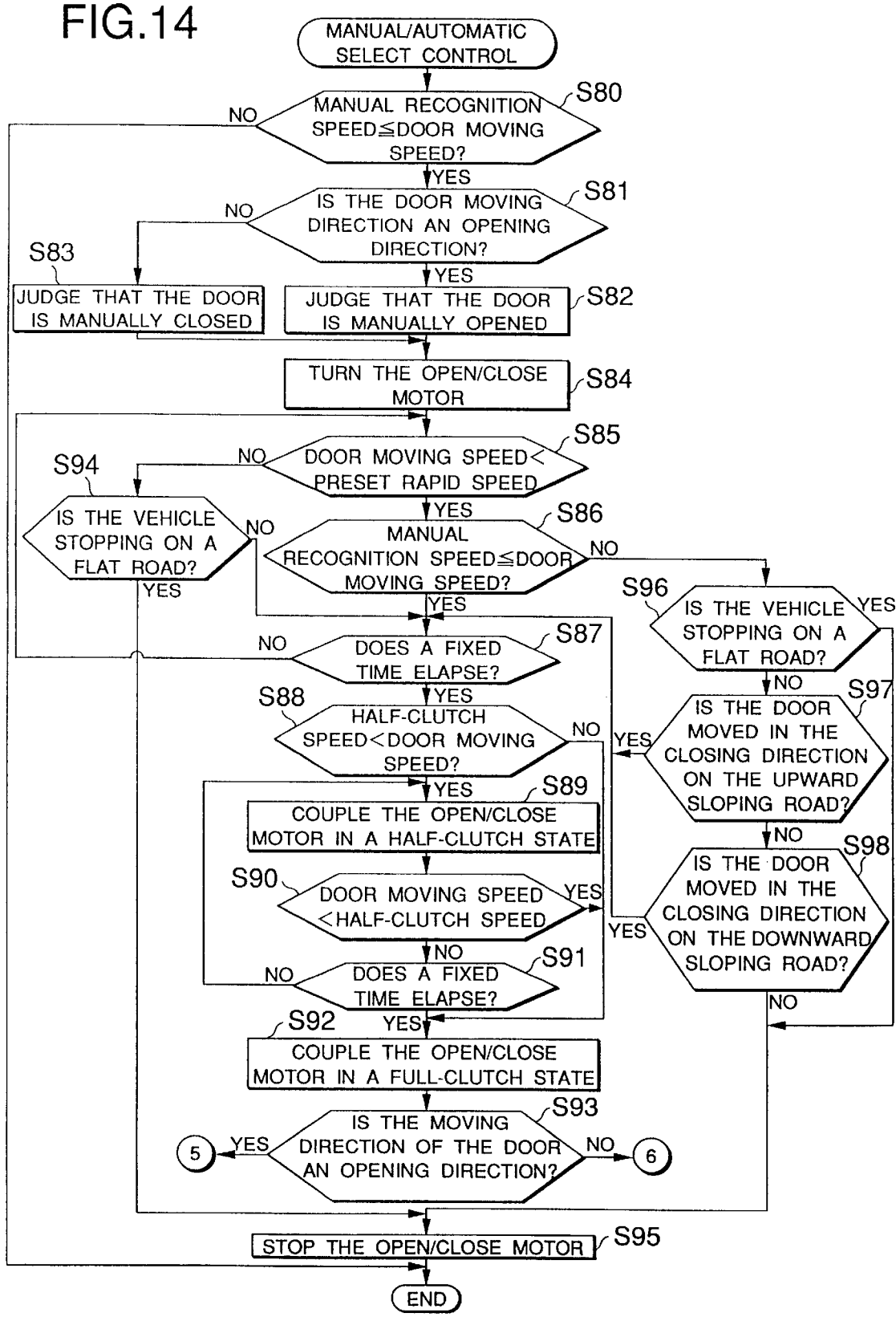

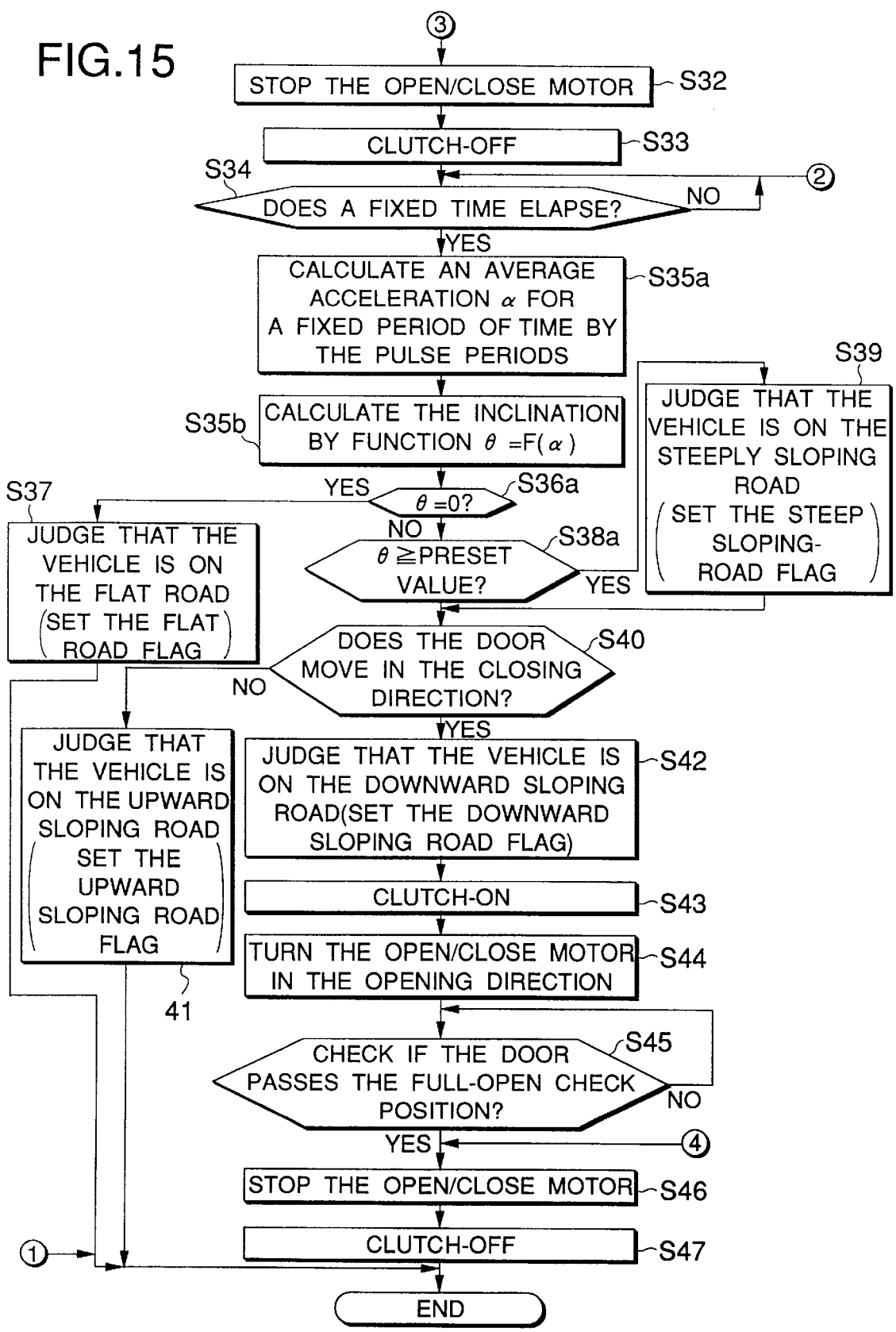

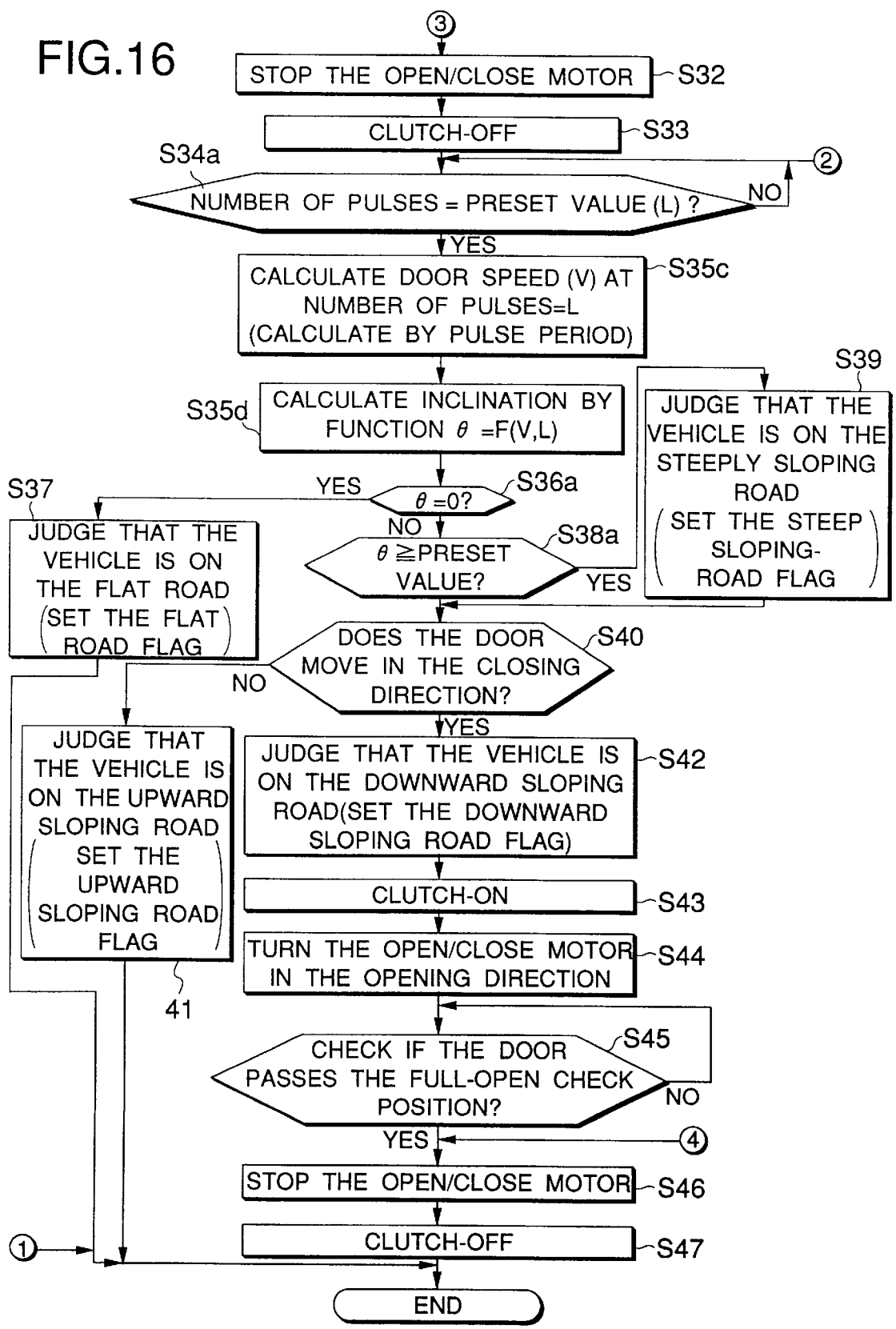

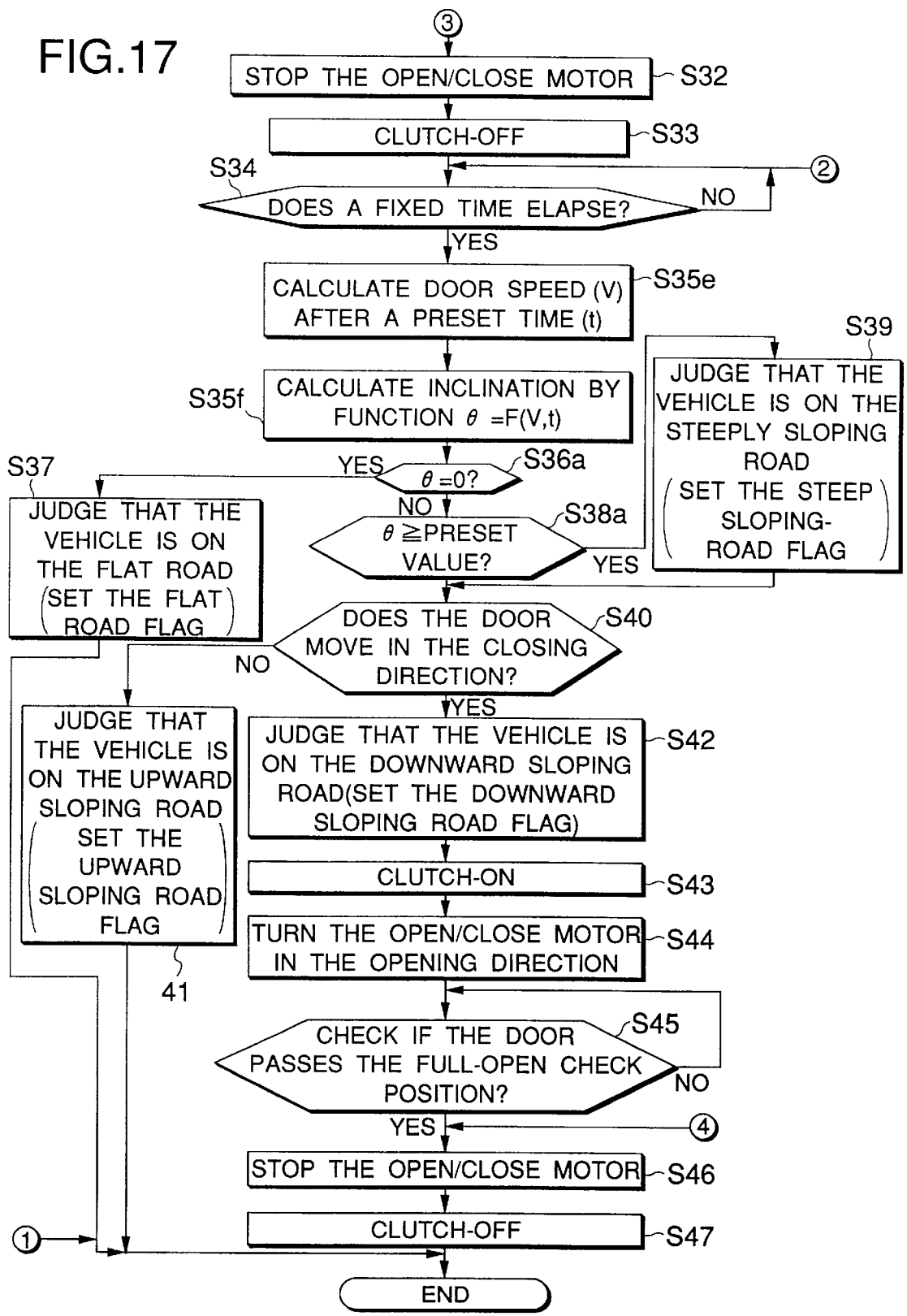

OPEN/CLOSE CONTROL SYSTEM FOR A VEHICLE SLIDE DOOR

BACKGROUND OF THE INVENTION

1. Field of the Invention

The present invention relates to an open/close control system for controlling the opening and closing operations of a slide door, which is mounted on the side of a vehicle body and driven by a drive source, e.g., a motor, in accordance with an inclination of the slide door produced when the vehicle is vertically inclined with respect to the longitudinal axis of the vehicle body, viz., when the vehicle stops on a sloping road.

2. Description of the Related Art

There is known an open/close control system for a vehicle slide door in which a slide door is mounted on the side of a vehicle body while being slidable in the lengthwise direction of the vehicle body, and is opened and closed by a drive source, e.g., a motor. An operating means is provided close to the driver's seat or a door handle. To open or close the slide door, a driver or any other occupant operates the operating means. In turn, the drive source is driven to move the slide door for its opening and closing.

The slide door is heavy, and moves linearly and in the lengthwise direction of the vehicle body. Therefore, when the vehicle body is vertically inclined with respect to the longitudinal axis of the vehicle body, the drive force to move the slide door is greatly varied.

When the vehicle is on a steep upward slope, a large drive force is required to move or slide the slide door in the upward direction. When the vehicle is on a flat road, a little force is required for the same purpose. When the vehicle is on a steep downward slope, a braking force, not the drive force, is required for sliding the slide door.

When the force, which is capable of moving the slide door being located on a steep slope in the upward direction, is used for moving the slide door in the upward direction, the force is too large to move the slide door in the horizontal or downward direction. A measure taken for this problem by the conventional technique is to control the force for moving or sliding the slide door in accordance with a door moving speed detected. This prior control usually uses a time delay technique for suppressing a hunting in the door movement. In a situation where the vehicle stops on a steep downward slope and its slide door is slid or moved downward direction, upon the start of door movement, the door rushes forward before the open/close control system operates.

When the vehicle is on a steep upward slope, to move its slide door in the upward direction, it is desirable to use a small drive force from the first in controlling the opening/closing operation of the door. To this end, it is very important to know an inclination of the vehicle body in the opening/closing control.

An open/close control system for a vehicle slide door is known in which when the slide door is manually moved, the control device detects the manual operation for the slide door and drives the drive motor to move or slide the door for its opening or closing. Specifically, the control device detects that a distance the slide door is manually moved reaches a preset value of distance or a moving speed of the slide door reaches a preset value of speed, and drives the motor to turn in such a direction as to move the door in the same direction as the moving direction of the manually moved door.

When the vehicle equipped with such a control device stops on a slope, a large force is required to manually move the slide door of the vehicle upward. Therefore, when the door is moved in the upward direction on the slope, it is desirable to quickly shift a control mode of the control device to a motor-driven control mode. One possible measure to obtain a quick shift of the control mode is to set the preset distance and the preset speed at small values. To this end, the necessity is to know a degree of inclination of the vehicle body before the open/close control for the slide door is exercised.

SUMMARY OF THE INVENTION

Accordingly, an object of the present invention is to provide an open/close control system which detects a vertical inclination of the vehicle body with respect to its longitudinal direction during the course of the movement of the slide doe, not using a sensor or a suitable device provided exclusively for the inclination sensing purpose, and controls the opening and closing of the slide door on the basis of the inclination of the vehicle body thus detected.

According to the present invention, there is provided an open/close control system for a vehicle slide door, comprising: a drive source; an opening/closing mechanism for moving the slide door being mounted on a side of a vehicle body for opening and closing; clutch means for transmitting a drive force of said drive source to said opening/closing mechanism interruptively; movement signal generating means for generating a signal dependent on a moving direction of said slide door; and slide door control means for controlling the drive force to be transmitted to said opening/closing mechanism by controlling said drive source and said clutch means, wherein said slide door control means stops an operation of said drive source and thereby stops said slide door, declutches said clutch means to allow said slide door to be movable, detects a movement of said slide door caused by weight by use of an output signal of said movement signal generating means, and determines an inclination of a vehicle according to a detection result.

In the open/close control system, the movement signal generating means preferably comprises an encoder rotating in a direction dependent on the moving direction of said slide door, and said slide door control means detects a moving state of said slide door by use of a phase relationship between two-phase pulse signals derived from said encoder. Hereupon, the slide door control means can detect an inclination of the vehicle body at a position where the vehicle stops, by counting number of pulses of a pulse signal output from said encoder for a fixed time. Or the slide door control means can detect an inclination of the vehicle body at a position where the vehicle stops, by detecting an acceleration of said slide door by use of a period variation of the pulse signals output from said encoder.

Further, it is preferable that, when said slide door control means detects that said slide door is moved in an opening direction by weight, by use of an output signal from said movement signal generating means, said slide door control means judges that the vehicle body is on an upward slope, when said slide door is moved in a closing direction, said slide door control means judges that the vehicle body is on an downward slope, and when said slide door is not moved, said slide door control means judges that the vehicle is on a flat road.

Still further, the slide door control means detects an inclination of the vehicle body at a position where the vehicle stops, by use of a distance said slide door moves and a door speed at that time, or a moving time of said slide door and a door speed at that time.

The open/close control system for a vehicle slide door, which is thus constructed according to the present invention, detects a phase relation of an output signal produced from the movement signal generating means (e.g., a two-phase pulse signal output from a rotary encoder), to thereby detect a moving status of the slide door, and detects a vertical inclination of the vehicle body with its longitudinal axis on the basis of the detected phase relation. Specifically, when the slide door moves in the opening direction, the open/close control system recognizes that the vehicle is on an upward sloping-road; when it moves in the closing direction, the control device recognizes that-the vehicle is on a downward sloping road; when it is standstill, the control device judges that the vehicle is on a flat road.

A state that the slide door moved down by its weight may be analogous to a state that a spherical body rolls down on and along a slope. An acceleration of the door can be derived from any of a distance the door moved and a moving speed of the door at that time, a moving time of the door and a moving speed thereof at that time, and a variation of a pulse period. Therefore, a degree of the inclination of the slide door can analogously be obtained using the acceleration of gravity.

The inclination information thus obtained is utilized for controlling the opening and closing of the slide door attached to the side of a vehicle in accordance with an inclination of the vehicle.

BRIEF DESCRIPTION OF THE DRAWINGS

In the accompanying drawings:

FIG. 13 is a flow chart showing the process of an automatic door closing control;

FIG. 14 is a flow chart showing the process of a manual/automatic select control;

FIG. 15 is a flow chart showing the process of a modification of the automatic door opening control shown in FIG. 12;

FIG. 16 is a flow chart showing the process of another modification of the automatic door opening control shown in FIG. 12; and FIG. 17 is a flow chart showing the process of yet another modification of the automatic door opening control shown in FIG. 12.

DETAILED DESCRIPTION OF THE PREFERRED EMBODIMENTS

Figure 1:
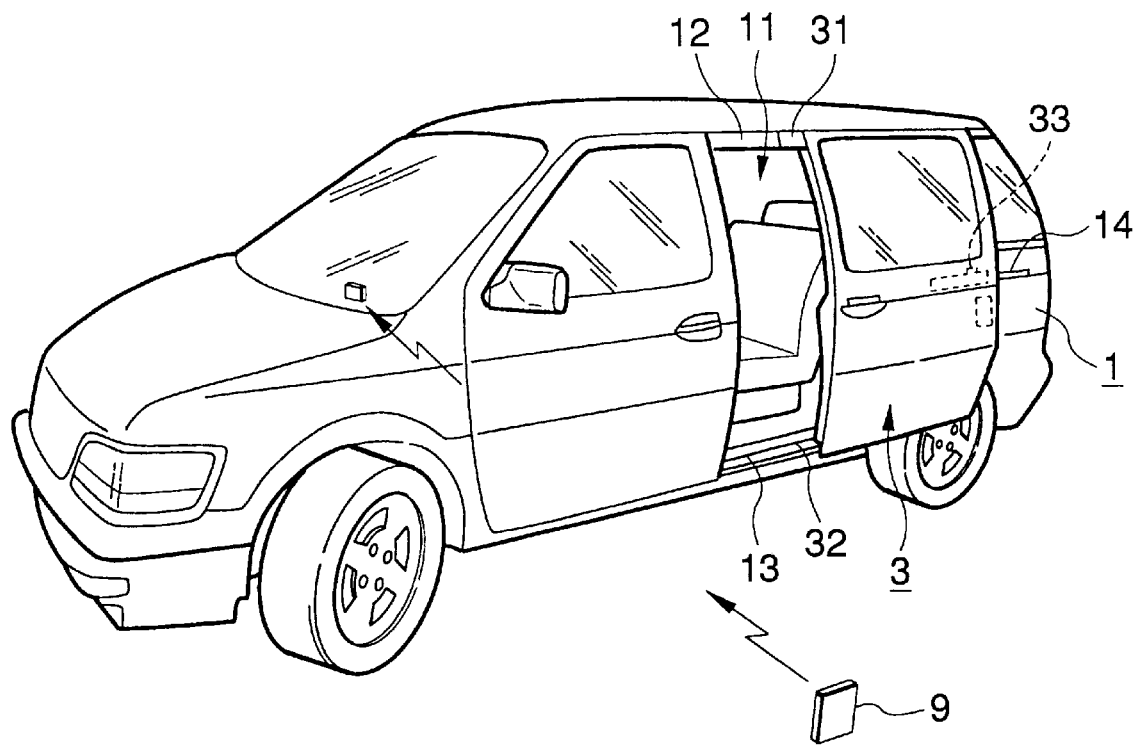
FIG. 1 is a perspective view showing an external appearance of a motor vehicle incorporating an open/close control system constructed according to the present invention.
Figure 2:
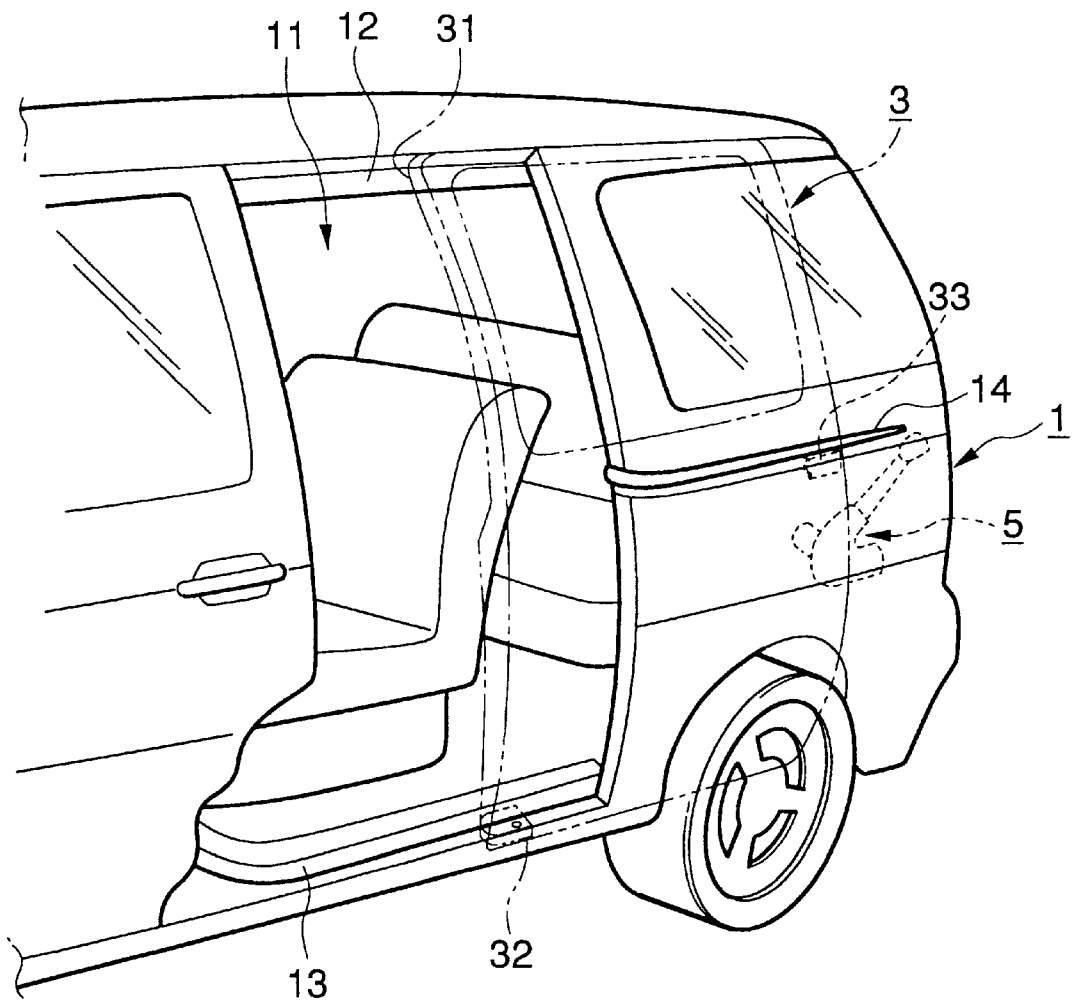
FIG. 2 is an enlarged, perspective view showing a vehicle body when the slide door is removed therefrom.
Figure 3:
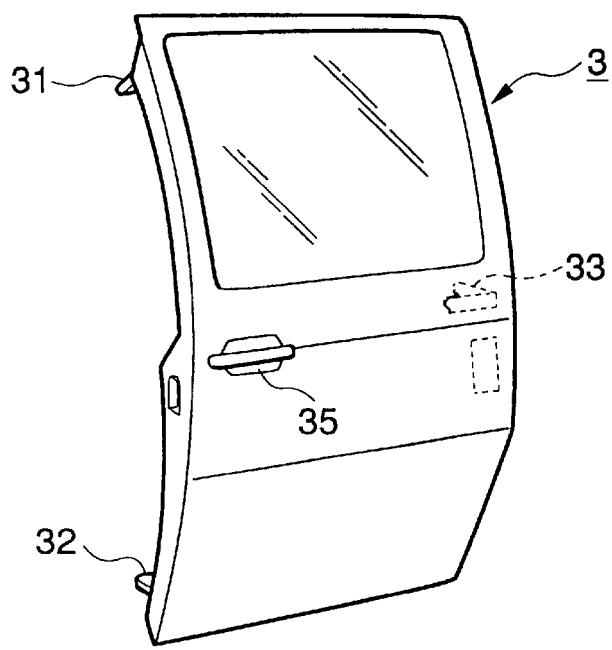
FIG. 3 is a perspective view showing the slide door alone.

FIG. 1 is a perspective view showing an external appearance of a motor vehicle incorporating an open/close control system for a vehicle slide door which is constructed according to the present invention. As shown, a slide door 3 is mounted on the side of a vehicle body 1 while being longitudinally slidable for its opening and closing. FIG. 2 is an enlarged, perspective view showing the vehicle body 1 when the slide door (indicated by a chain line) is removed. FIG. 3 is a perspective view showing the slide door 3 alone.

In those figures, the slide door 3 is mounted on the vehicle body 1 while being longitudinally slidable in the following way. An upper sliding coupler 31 is fastened on the upper end of the inner side of the slide door 3, and a lower sliding coupler 32 is fastened on the lower end of the door inner side. An upper track 12 is provided along the upper edge of an door opening portion 11 of the vehicle body 1, and a lower track 13 is provided along the lower edge thereof. The upper sliding coupler 31 and the lower sliding coupler 32 are coupled with the upper track 12 and the lower track 13, respectively.

A hinge arm 33 is mounted on the rear end of the inner side of the slide door 3. A guide track 14 is fastened to a portion near the waist of the rear part of the vehicle body 1. The slide door 3 is guided along the guide track 14 in a state that the hinge arm 33 is slidably engaged with the guide track 14. The slide door 3 is moved from a closed position to an open position, while being protruded slightly outward from the outer panel of the vehicle body 1 and in parallel with the outer surface of the outer panel of the vehicle body 1. At the closed position, the door opening portion 11 is tightly closed with the slide door, and at the open position the door opening portion 11 is fully opened.

Further, the slide door 3 is held at the full close position at the certain closed state so that a door lock 34 provided in the end portion of the opening engages with a striker fixed on a side of the vehicle body 1 at the full close position. A door handle 35 is mounted on the outer surface of the slide door 3. The door handle is used for manually opening and closing the slide door 3.

Figure 4:
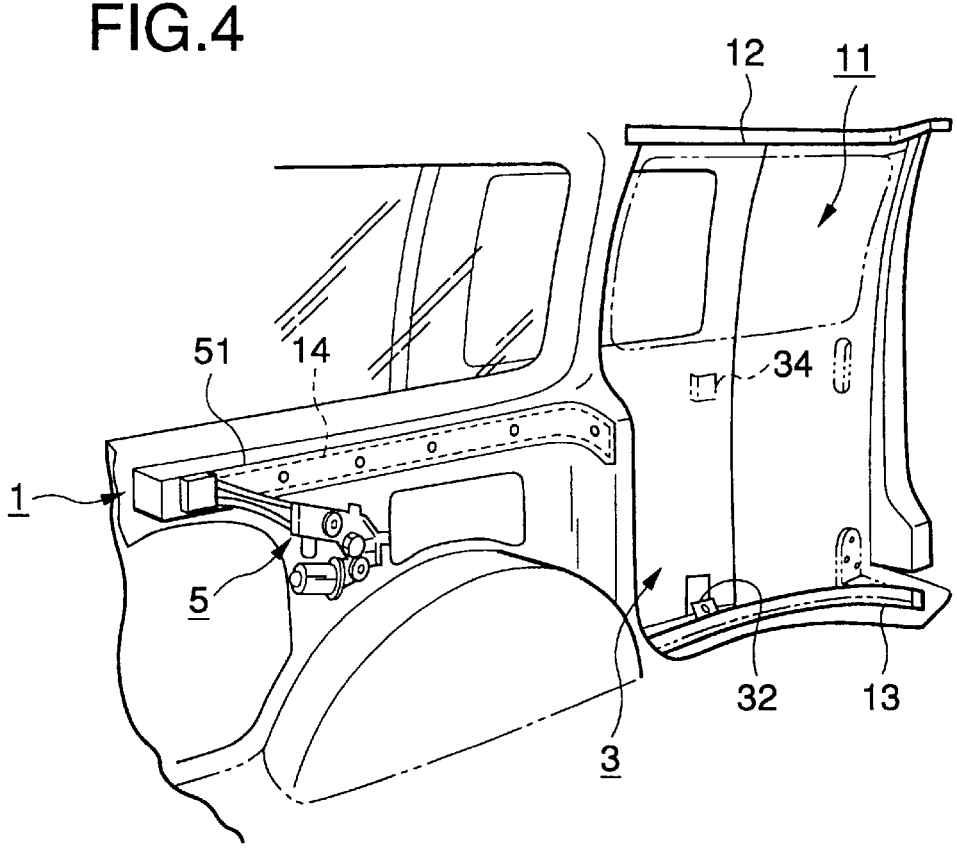
FIG. 4 is a perspective view showing a slide door mounting portion of the vehicle when viewed from the inside of the vehicle.

As shown in FIG. 4, a slide door drive mechanism 5 is provided in a space between the outer and inner panels of the vehicle body 1. The outer panel demarcates the outside of the vehicle body 1, and the inner panel is located within the vehicle. In the slide door drive mechanism 5, a cable 51, which is disposed within the guide track 14, is coupled with the slide door 3 and a motor. In operation, the slide door 3 is moved for its opening and closing by the cable 51, which is moved by the motor.

In the present embodiment, either open/close switches attached to the inside of the vehicle or a wireless remote switch 9 (FIG. 1) is selectively used for generating open and close instructions. The construction for the open/close instruction generation will be described subsequently.

Figure 5:
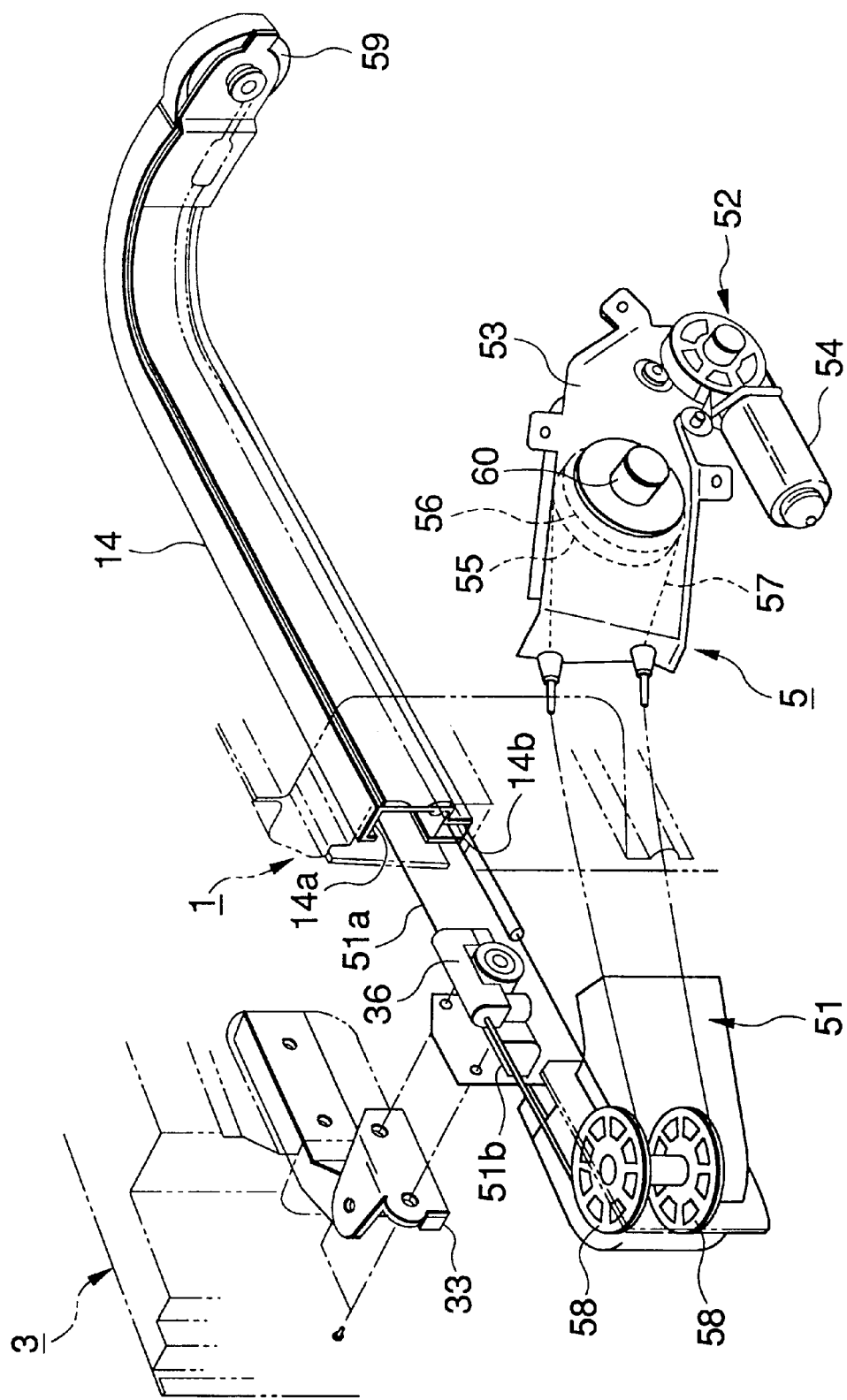
FIG. 5 is a perspective view showing a key portion of a slide door drive mechanism.

FIG. 5 is a perspective view showing a principal portion of a slide door drive mechanism. As shown, the slide door drive mechanism 5 includes a drive means 52. The drive means 52 includes an open/close motor 54, a drive pulley 55, and a reduction means 57, these being all fastened onto a base plate 53 that is fixed to within the vehicle body 1 by means of bolts, for example. The open/close motor 54 is reversible and operates to open and close the slide door. The cable 51 is wound on the drive pulley 55. The reduction means 57 contains an electromagnetic clutch 56 therein.

The drive pulley 55 includes a reduction mechanism whose rotation transmission force is reversible; it reduces the number of revolutions of the open/close motor 54, and increases an output torque; and it transmits a turning effort of the motor to the cable member 51. The electromagnetic clutch 56 is magnetically excited at proper timings when the motor 54 is driven, to thereby couple the motor 54 with the drive pulley 55 mechanically.

A pair of guide pulleys 58 are provided on the rear side of the guide track 14. An upper channel 14a and a lower channel 14b are formed in the guide track 14 while being parallel to each other. The upper channel 14a is shaped like U while being opened outward. A reversal pulley 59 is provided at the front end of the guide track 14. The cable 51 is wound at one end around the drive pulley 55 and at the other end around the reversal pulley 59 in an endless fashion. The upper cable of the endless cable 51 is put at the mid point on the guide pulleys 58 and passes through the upper channel 14a of the guide track 14, while the lower cable thereof is put at the mid point on the guide pulleys 58 and passes through the lower channel 14b.

A moving member 36 is secured to an appropriate position of the upper cable of the endless cable 51, which travels through the upper channel 14a of the guide track 14. The moving member 36 is secured so as to secure its smooth travelling through the upper channel 14a. The fore part of the upper cable with respect to the moving member 36 serves as a door-opening cable 51a, while the rear part of the same serves as a door-closing cable 51b.

The moving member 36 is coupled with the rear end of the inner side of the slide door 3 through the hinge arm 33. It is moved forward or backward within the upper channel 14a by a pulling force of the door-opening cable 51a or the door-closing cable 51b to thereby move the slide door 3 in the door closing or opening direction. An opening/closing mechanism (slide door drive mechanism 5) is constituted by the aforementioned parts.

A rotary encoder 60 as movement signal generating means is coupled with the rotary shaft of the drive pulley 55. The rotary encoder measures a rotation angle of the rotary shaft at a high resolution. With a turn of the drive pulley 55, the rotary encoder 60 generates a pulse signal containing the number of pulses that depends on an rotation angle of the drive pulley 55. The pulse signal represents an amount of the movement of the cable 51 that is wound on the drive pulley 55, viz., an amount of the movement of the slide door 3. The number of pulses that are generated from the rotary encoder 60 are counted over a range from the closed position of the slide door 3 to the open position, by a proper counter (not shown). Then, a count N of the counter represents a current position of the moving member 36, viz., a current position of the slide door 3.

Figure 6:
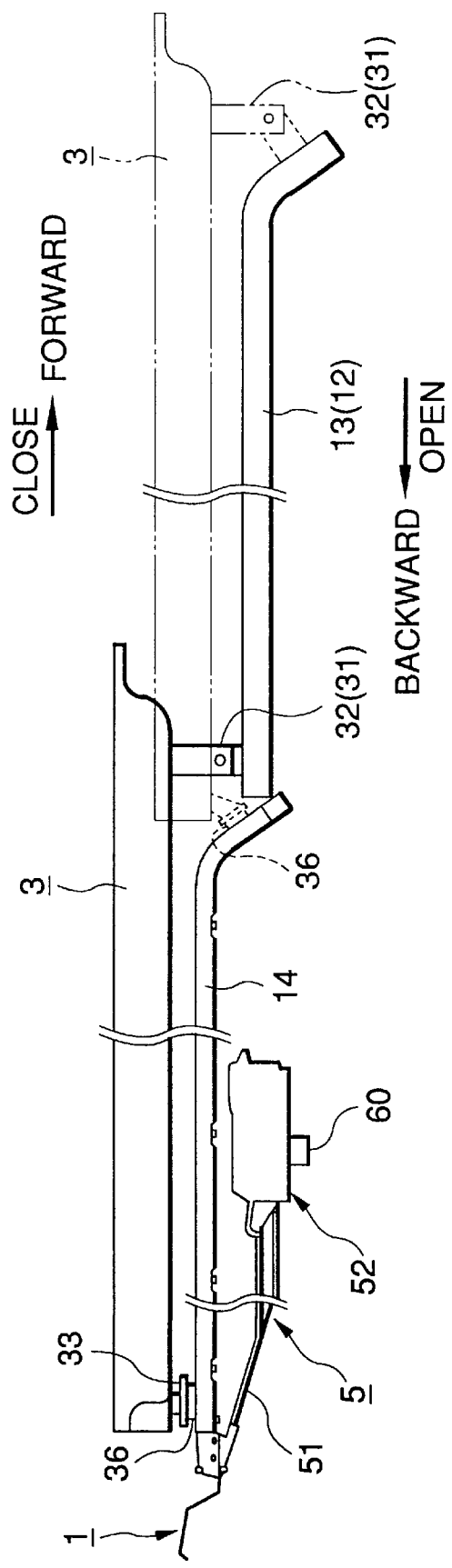
FIG. 6 is a plan view schematically showing a movement of the slide door.

FIG. 6 is a plan view schematically showing a movement of the slide door. As already stated, the upper sliding coupler 31 and the lower sliding coupler 32 are slidably coupled with the upper track 12 and the lower track 13, respectively, to thereby hold the fore part of the slide door 3. The hinge arm 33 is secured to the cable 51 through the moving member 36, to thereby hold the rear part of the slide door 3.

Figure 7:
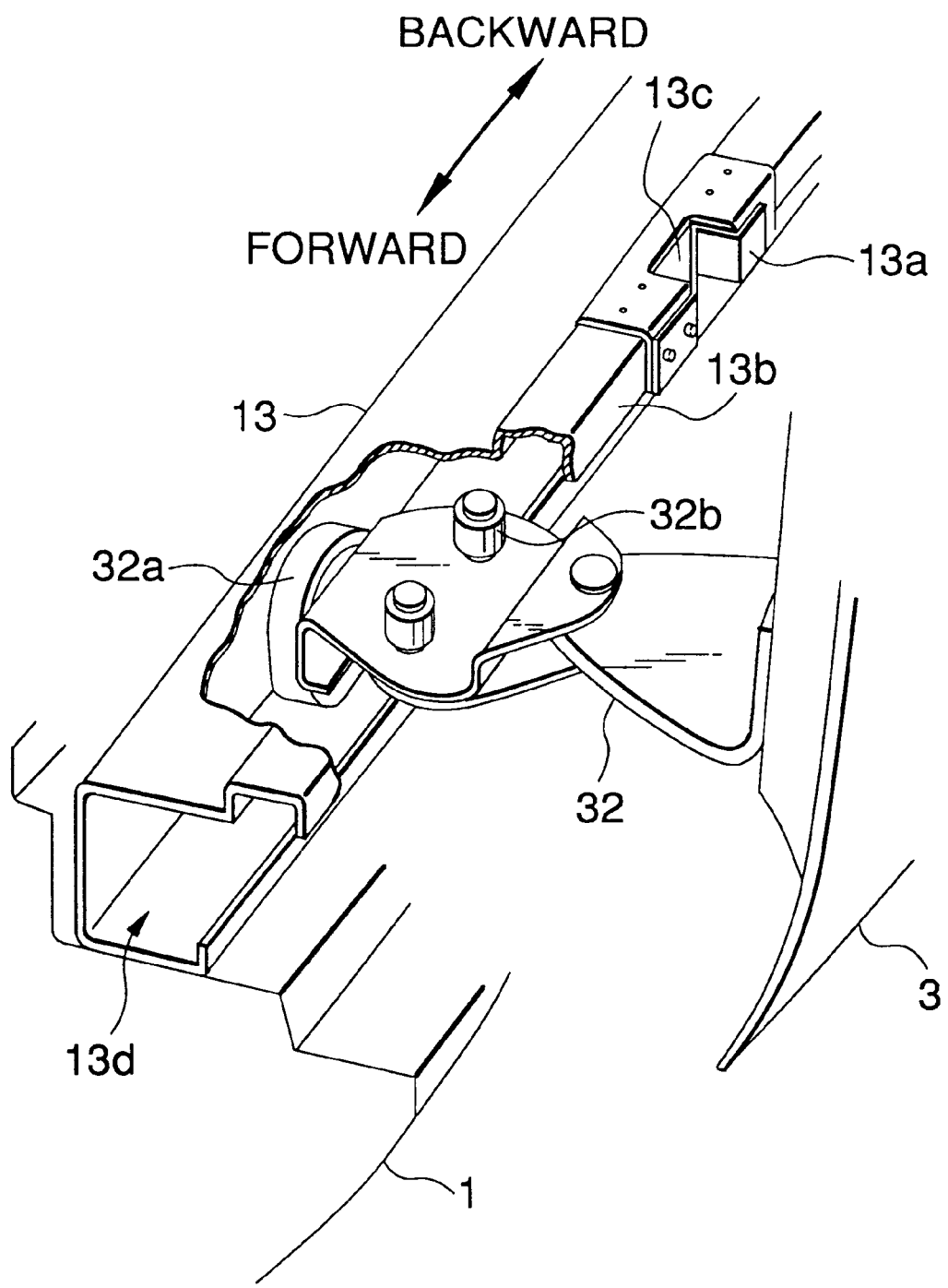
FIG. 7 is a perspective view showing a full-open check mechanism provided on the lower track.

FIG. 7 is a perspective view showing a full-open check mechanism provided on the lower-track 13. The full-open check mechanism includes a full-open check member 13a. The full-open check member 13a has a plate spring member shaped like a V of which one side is steeply slanted and the other side is gently slanted. The full-open check member 13a is put in a hole 13c of the lower track 13, and the gently slanted side of the V-shaped full-open check member 13a is secured, in a cantilever fashion, to the lower track 13. The hole 13c is formed in the upper end face 13b of the opening of the lower track 13 as shown.

When the slide door 3 is moved rearward from a position shown, a vertical roller 32a rotates on the bottom surface 13d of the lower track 13, while a horizontal roller 32b rotates in contact with the inner surface of the upper end face 13b. The vertical roller 32a and the horizontal roller 32b are coupled with the slide door 3 through the lower sliding coupler 32.

When the horizontal roller 32b reaches the full-open check member 13a, it pushes aside or outward the gently slanted side of the full-open check member 13a and reaches the full open check position. At the full open check position, a movement of the horizontal roller 32b in closing direction is blocked by the steeply slanted side of the full-open check member 13a, and therefore the slide door 3 is held at the full open check position. At this time, the steeply slanted side of the full-open check member 13a is slightly slanted. Therefore, if a strong force is applied to the door, the horizontal roller 32b pushes outward the steeply slanted side of the full-open check member 13a and moves forward.

Slide Door Control Unit

Figure 8:
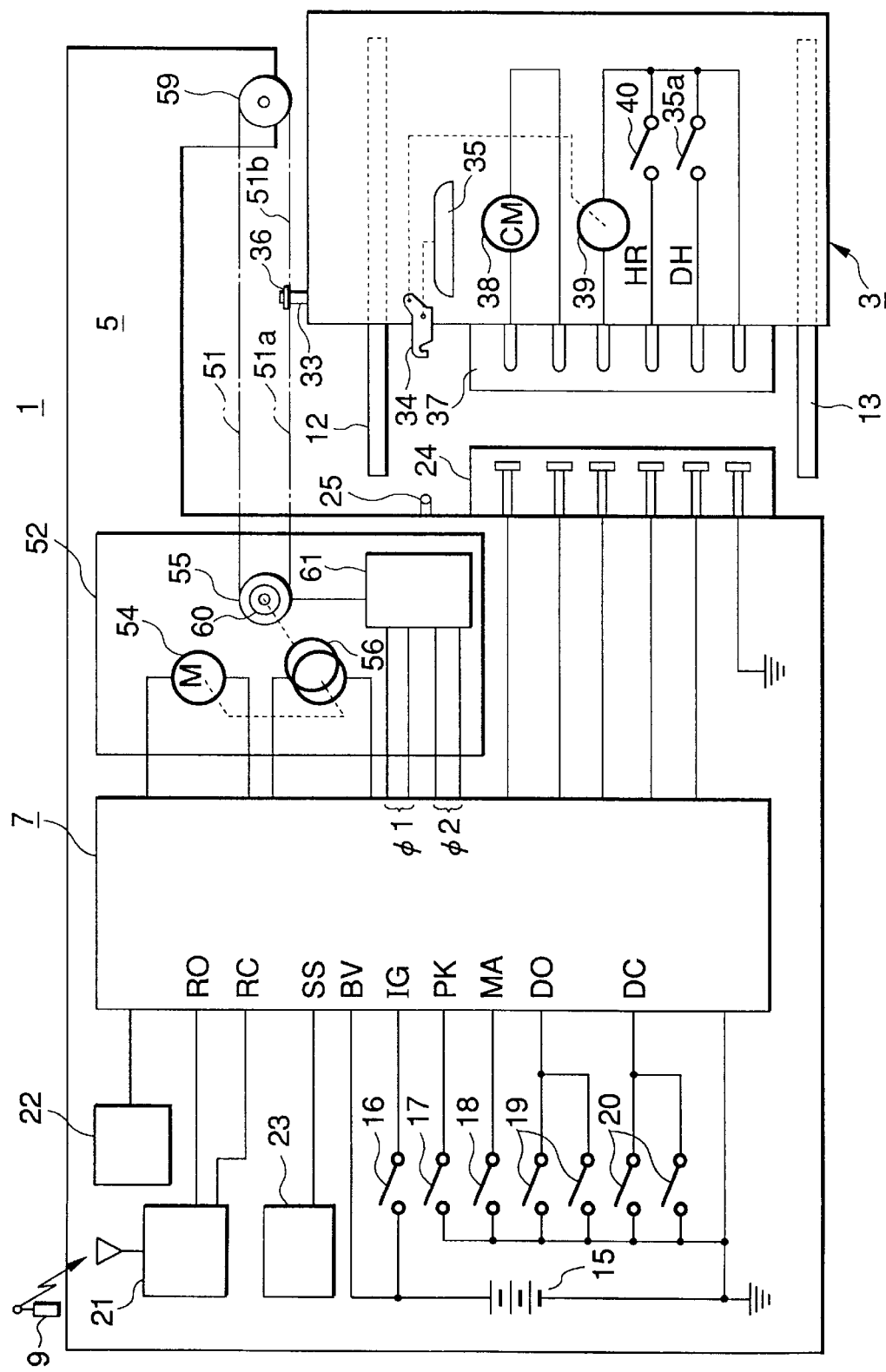
FIG. 8 is a block diagram showing a connection of a slide door control unit and its related electrical components.

The electrical connections of a slide door control unit 7 and the electrical components mounted on the vehicle body 1 and the slide door 3 will be described with reference to a block diagram shown in FIG. 8. The slide door control unit 7 is installed, for example, at a location near the drive means 52 in the vehicle body 1. The slide door control unit 7 controls the slide door drive mechanism 5, and uses a program control by a microcomputer for the control.

The electrical connections of the slide door control unit 7 to the electrical components in the vehicle body 1 are: it is connected to a battery 15 to receive a DC voltage BV therefrom, an ignition switch 16 to receive an ignition signal IG, a parking switch 17 to receive a parking signal PK, and a main switch 18 for receiving a main switch signal MA.

Further, the slide door control unit 7 is connected to a door opening switch 19 to receive a door open signal DO therefrom, a door closing switch 20 to receive a door close signal DC, a keyless system 21 to receive a remote open signal RO or a remote close signal RC from the wireless remote switch 9, a buzzer 22 for generating an alarm when the slide door 3 is automatically opened or closed, and a speed sensor 23 to receive a vehicle speed signal SS. The opening switch 19 and the closing switch 20 are each provided with two contacts as shown, for the reason that these switches are mounted at two locations, for example, the driver's seat and the rear seat.

The connections of the slide door control unit 7 to the slide door drive mechanism 5 are the connections for supplying electric power to the open/close motor 54, for controlling the electromagnetic clutch 56, and the connection with the pulse generator 61 which outputs pulse signals φ1 and φ2 by receiving pulse signals from the rotary encoder 60.

The slide door control unit 7 are electrically connected to the electrical components in the slide door 3 when the vehicle connector 24 mounted at a position of the door opening portion 11 is connected to the door connector 37 mounted at the opening end of the slide door 3 in a state that the slide door 3 is slightly moved for opening from the closed position.

When the slide door control unit 7 is thus connected to the electrical components in the slide door 3, the following electrical connections are set up: the connection for supplying electrical power to the closure motor (M) 38 to tighten the slide door 3 being in a half-latch state to its full-latch state, the connection for supplying electric power to the actuator (ACTR) 39 to drive the door lock 34 out of a striker 25, the connection for detecting a half-latch to receive a half-latch signal HR from the half-latch switch 40, the connection for receiving a door handle signal DH from a door handle switch 35a to detect an operation of the door handle 35 coupled with the door lock 34, and other connections.

Figure 9:
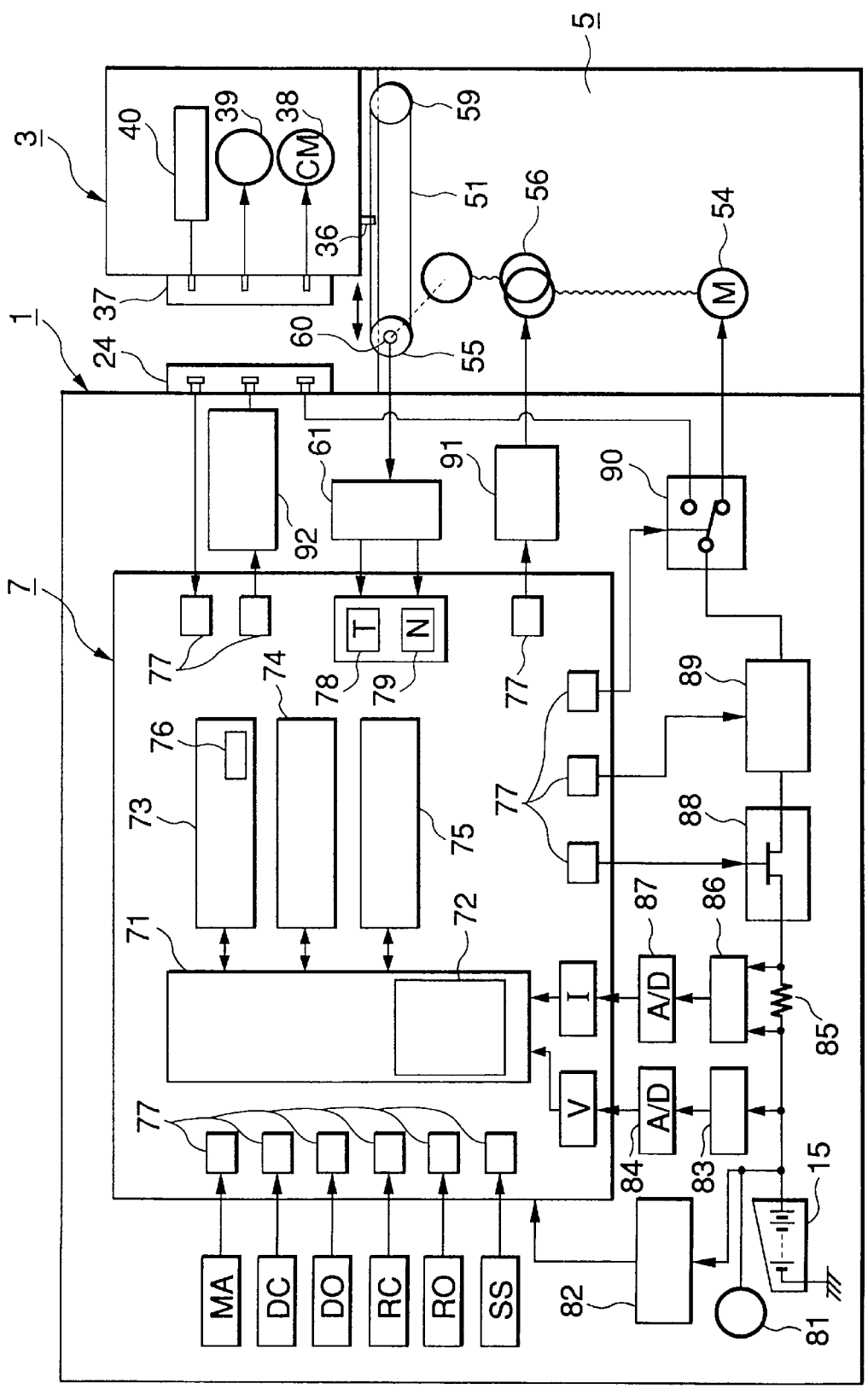
FIG. 9 is a block view showing a key portion of the slide door control unit.

An arrangement of the slide door control unit 7 will be described with reference to a block diagram of FIG. 9. The slide door control unit 7 includes a main controller 71 and repeats its control at fixed periods of time. The main controller 71 contains a control mode selector 72 for selecting a proper control mode according to the statuses of the peripheral circuits.

The control mode selector 72 selects the special purpose controller most suitable for the slide door control from among those controllers according to the latest statuses of the peripheral circuits. The special purpose controllers are an automatic slide controller 73, a speed controller 74 and a pitching controller 75. The automatic slide controller 73 controls mainly the opening and closing of the slide door 3. The speed controller 74 controls a moving speed of the moving slide door 3. The pitching controller 75 detects if an object obstructs the movement of the moving slide door 3.

A slide-door control unit 7 includes a plural number of input/output ports 77 provided for the inputting/outputting of on/off signals from the various switches, operation/nonoperation signals of the relays, clutches and the like.

Figure 10:
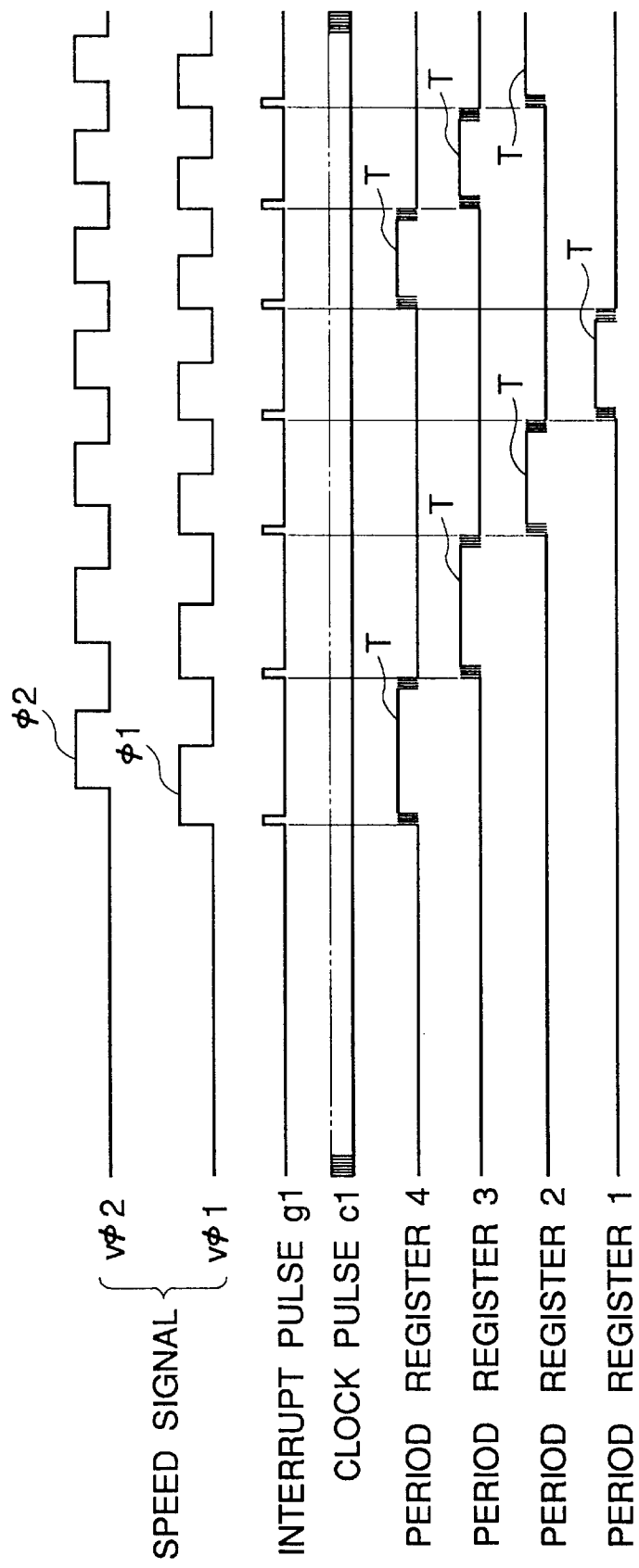
FIG. 10 is a timing chart for explaining an operation of a speed calculating portion.

A speed calculating portion 78 and a position detector 79 receives 2-phase pulse signals $\phi 1$ and $\phi 2$ from a pulse generator 61, and generates a period count value T and a position count value N on the basis of those pulse signals. An operation of the speed calculating portion 78 will be described with reference to a timing chart shown in FIG. 10.

2-phase speed signals $V\phi 1$ and $V\phi 2$ correspond to the 2-phase pulse signals $\phi 1$ and $\phi 2$ output from the rotary encoder 60, respectively. A phase relationship between both the speed signals $V\phi 1$ and $V\phi 2$ is used for detecting the direction of rotation of the rotary encoder 60, i.e., the direction of movement of the slide door 3. Specifically, when the pulse signal $\phi 2$ is in a low (L) level at the leading edge of the pulse signal $\phi 1$ (as illustrated), the slide door control unit 7 judges that the door is moving in its opening direction; when it is in a high (H) level at the same time point, the control unit judges that the slide door is moving in its closing direction.

The speed calculating portion 78 generates an interrupt pulse g1 at the leading edge of the speed signal $V\phi 1$. During the period of the interrupt pulse g1, the speed calculating portion 78 counts the number of clock pulses C1 the period of which is much shorter than that of the interrupt pulse g1. A count value gained is used as a period count value T. Therefore, the period count value T is equivalent to a digitized value of the period of the pulse signal $\phi 1$ output from the rotary encoder 60.

The open/close control system under discussion is designed so as to recognize a speed of the slide door 3 on the basis of the period count value of four successive periods of the speed signal $V\phi 1$. For this reason, four period registers 1 to 4 are included for storing the period count values of four periods. A position count value N may be obtained by counting the speed signal $V\phi 1$, i.e., the number of interrupt pulses g1.

Returning to FIG. 9, the battery 15 is charged by a dynamotor 81 when the vehicle runs, and the output voltage of the battery is stabilized into a constant voltage by a stabilizing power source circuit 82, and applied to the slide door control unit 7.

The output voltage of the battery 15 is detected by a voltage detector 83, and converted into a digital signal by an A/D convertor 84. The digital signal is input to the main controller 71 of the slide door control unit 7.

The output voltage of the battery 15 is applied to a shunt resistor 85, and a current flowing through the shunt resistor 85 is detected by a current detector 86. A current I detected is converted into a digital signal by an A/D convertor 87, and the digital signal is input to the main controller 71 of the slide door control unit 7.

The output voltage of the battery 15 is applied to a power switch element 88 by way of the shunt resistor 85. The power switch element 88, which is on/off controlled by the slide door control unit 7, converts a DC signal into a pulse signal, and applies the converted pulse signal to the open/close motor 54 or the closure motor 38. A duty ratio of the pulse signal may be controlled as desired.

The pulse signal derived from the power switch element 88 is applied to the open/close motor 54 and the closure motor 38 by way of a polarity reversing circuit 89 and a motor select circuit 90. The polarity reversing circuit 89 is provided for changing the turning direction of the open/close motor 54 or the closure motor 38. The polarity reversing circuit 89, together with the power switch element 88, forms a power supplying circuit.

The motor select circuit 90 selects either the open/close motor 54 or the closure motor 38 in accordance with an instruction issued from the main controller 71. Those motors are both used for driving the slide door 3, but are not driven simultaneously. For this reason, drive power is selectively fed to the motors. A clutch drive circuit 91 and an actuator drive circuit 92 are further used. The clutch drive circuit 91 is for controlling the electromagnetic clutch 56 in accordance with an instruction issued from the main controller 71. The actuator drive circuit 92 is for controlling the actuator 39 in response to an instruction from the main controller 71.

Operation/Automatic Opening Control

How the slide door control unit 7 performs opening and closing controls for the slide door 3 in the open/close control system thus constructed will be described with reference to flow charts shown in FIGS. 11 to 14. Those controls are valid under when following conditions are satisfied: the main switch 18 has been turned on and power source voltage has been supplied to various circuit components and units including the slide door control unit 7; the parking switch 17 has been turned on and a shift position has been set at a P (parking) range, viz., the vehicle is standstill; it has been sensed by speed sensor 23; and the door lock knob has been operated for its unlocking and the slide door 3 is ready for opening. When any of those conditions is not satisfied, a manual open/close operation is permitted, but the automatic opening/closing control for the slide door is not performed.

Figure 11:
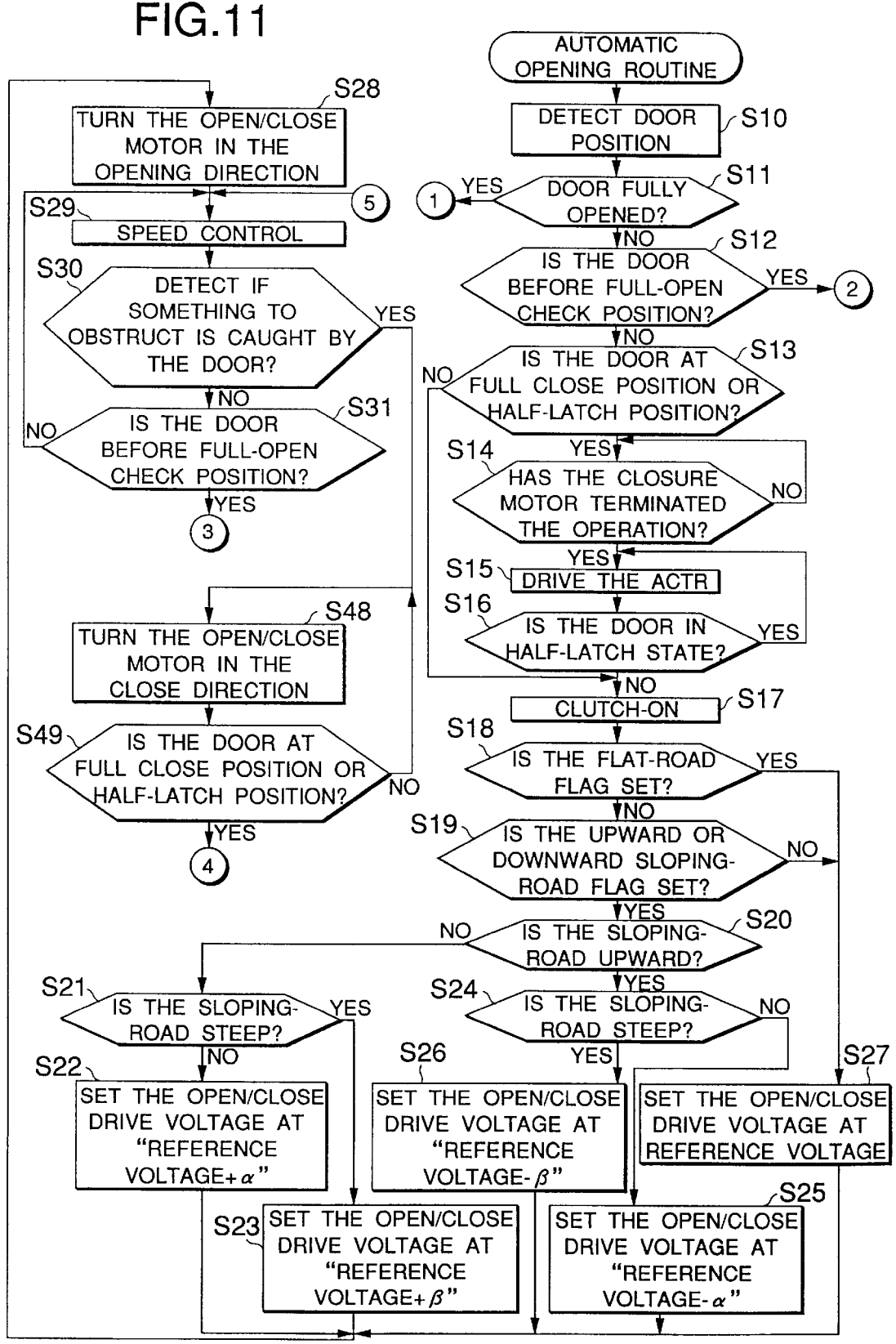
FIG. 11 is a flow chart showing the first half of the process of an automatic door opening control.

An automatic door opening control will be described with reference to the flow charts shown in FIGS. 11 and 12. In the opening control, an instruction to open the slide door is given by the door open switch 19 or the wireless remote switch 9, and the slide door 3 is moved up to the full open position.

The automatic door opening control starts when the slide door control unit 7 receives a door open signal DO or a remote door-open signal RO. In this control mode, the slide door control unit 7 obtains a current position of the slide door 3 by utilization of a position count value N (step S10), and judges whether or not the door is at the full open position (step S11). If it is at the full open position, the slide door control unit 7 clears the control mode since the automatic door opening control is not needed.

If it is not at the full open position, the slide door control unit 7 judges whether or not the door is at a position before full-open check position (viz., it is at a position before the full-open check member 13a) (step S12). If it is not at a position before the full-open check position (step S13), the control unit judges whether the door is at the full close position or a half-latch position (step S13). If the door is at the full close position or a half-latch position, the control unit checks if the closure motor (CM) 38 has terminated its operation (step S14); if the answer is YES (terminated), the control unit drives the actuator (ACTR) 39 and pulls the door lock 34 from the striker 25 (step S15); and the control unit confirms that the half latch switch 40 is in an off state and judges if the slide door 3 is in a half-latch state (step S16).

If the door is not at the full open position or a half-latch position (step S13) or not in the half-latch state (step S16), the control unit controls the clutch drive circuit 91 so that the open/close motor 54 is mechanically coupled into the drive pulley 55 by the electromagnetic clutch 56 (step S17).

Then, the control unit sets the open/close drive voltage at "reference voltage+$\alpha$" (steps S20, S21 and S22) when the following conditions are set up: a) a flat-road flag is not set (step S18); b) an upward or downward sloping-road flag is set (step S19); and c) the sloping road is downward in direction and gentle in inclination. The same sets the open/close drive voltage at "reference voltage+$\beta$" (steps S20, S21 and S23) when the states of those flags are the same as above, and the sloping road is downward and steep ($\alpha < \beta$).

The control unit sets the open/close drive voltage at "reference voltage−$\alpha$" (steps S20, S24 and S25) when the states of those flags are the same as above, and the sloping road is upward and gentle. The same sets the open/close drive voltage at "reference voltage−$\beta$" (steps S20, S24 and S26) when the states of those flags are the same as above, and the sloping road is upward and steep.

The control unit sets the open/close drive voltage at reference voltage (step S27) when the flat road flag is set (step S18) or the upward or downward sloping-road flag is not set (step S19).

When the setting of the open/close drive voltage is completed the control unit sets the motor select circuit 90 to the position for the open/close motor 54, and it controls the power switch element 88 and the polarity reversing circuit 89 so as to turn the open/close motor 54 in the opening direction (step S28).

Subsequently, the control unit controls the number of revolutions of the open/close motor 54 through the control of the power switch element 88 so that the slide door 3 is moved at a proper speed in the opening direction (step S29). Through the control, the control unit detects if something to obstruct the movement of the slide door 3 is caught by the door (step S30). During the control, if the control unit detects that the slide door 3 reaches the before-full-open check position (step S31), it stops the open/close motor 54 through the power switch element 88 (step S32), and controls the clutch drive circuit 91 to declutch the electromagnetic clutch 56 and to thereby remove the mechanical coupling of the open/close motor 54 with the drive pulley 55 (step S33).

In this state or if the slide door reaches the before full-open check position (step S12), the control unit waits for a fixed time (step S34); if the number of each of the 2-phase pulse signals $\phi1$ and $\phi2$ is zero (step S35, S36), the control unit judges that the vehicle is on the flat road and sets the flat road flag (step S37); and it ends the control process.

If pulse signals are generated and the number of pulses of the pulse signal is above a preset value (step S38), the control unit judges that the vehicle is on a steeply sloping road and sets a steep sloping-road flag (step S39). When pulse signals $\phi1$ and $\phi2$ are generated, the control unit judges whether the slide door 3 moves in the opening or closing direction on the basis of a phase relationship (step S40); if the door moves in the opening direction (step S40), the control unit judge that the vehicle is on the upward sloping-road; and it sets a upward sloping road flag (step S41), and ends the control process.

If the door moves in the closing direction, the control unit judges that the vehicle is on the downward sloping-road and sets an downward sloping-road flag (step S42). And to prevent the slide door 3 from moving in the closing direction by its weight, the control unit controls the clutch drive circuit 91 again to drive the electromagnetic clutch 56 to couple the open/close motor 54 with the drive pulley 55 (step S43), and it controls the power switch element 88 and the polarity reversing circuit 89 to turn the open/close motor 54 in the door opening direction (step S44).

In turn, the slide door 3 moves in the opening direction again; the sliding coupler 32 moves over the full-open check member 13a and passes a full-open check position (step S45); the control unit controls the power switch element 88 to stop the turn of the open/close motor 54 (step S46); it controls the clutch drive circuit 91 to remove the coupling of the open/close motor 54 with the drive pulley 55 by the electromagnetic clutch 56 (step S47); and it ends the control process.

In this way, the open/close control system of the invention controls a stop position of the slide door 3 on the basis of an inclination of the vehicle body. When the vehicle is on a flat or an upward sloping-road, the slide door 3 is stopped at a position before the full-open check member 13a. In other words, the slide door does not move over the full-open check member 13a. Therefore, the slide door is less impeded in its closing movement. On the other hand, when the vehicle is on a downward sloping-road, the slide door 3 is moved over the full-open check member 13a and then is stopped. The result is that the slide door 3 is not closed by its weight.

If an obstacle is caught by the door (step S30), the control unit causes the polarity reversing circuit 89 to turn the open/close motor 54 in the reverse direction (step S48). If it is detected that the slide door moves to reach the full close position or the half-latch position (step S49), the control unit causes the power switch element 88 to stop the open/close motor 54 (step S46), and it declutches the electromagnetic clutch 56 to decouple the open/close motor 54 from the drive pulley 55 (step S47), and ends the control process.

The step S30 to detect as to whether or not an obstacle is caught by the door may be realized by utilization of a value of current I flowing through the open/close motor 54 and a phase relationship between the speed signals V$\phi1$ and V$\phi2$.

Specifically, the control unit judges that something stands in the moving path of the slide door 1) if a current value I detected by the current detector 86 is large, and 2) if the relative periods of the speed signals V$\phi$1 and V$\phi$2 stop or remarkably decelerate the drive pulley 55 even though the current is fed to the open/close motor 54.

For the step S31 to detect the before full-open check position and the step S45 to detect the full-open check position passing, a position count value N may be monitored with its initial value of the full open position of the slide door 3. Alternatively, a plural number of limit switches are provided at proper positions along the moving path of the slide door 3, and the operations of those limit switches are monitored.

Automatic Door Closing Operation

An automatic door closing control will be described with reference to a flow chart shown in FIG. 13. In the closing control, an instruction to open the slide door is given by the door closing switch 20 or the wireless remote switch 9, and the slide door 3 is moved up to the full close position.

The automatic door closing control starts when the slide door control unit 7 receives a door close signal DC or a remote door-close signal RC. In this control mode, the slide door control unit 7 obtains a current position of the slide door 3 by utilization of a position count value N (step S50), and judges whether or not the door is at the full close position or in the half-latch region (step S51). If it is at the full close position or in the half-latch region, the slide door control unit 7 clears the control mode since the door closing control is not needed.

If it is not at the full close position or in the half-latch region, the slide door control unit 7 controls the clutch drive circuit 91, and the clutch drive circuit causes the electromagnetic clutch 56 to mechanically couple the open/close motor 54 with the drive pulley 55 (step S52).

Then, the control unit sets the open/close drive voltage at "reference voltage+$\alpha$" (steps S55, S56 and S57) when the following conditions are set up: a) a flat-road flag is not set (step S53); b) an upward or downward sloping-road flag is set (step S54); and c) the sloping road is upward in direction and gentle in inclination. The same sets the open/close drive voltage at "reference voltage+$\beta$" (steps S55, S56 and S58) when the states of those flags are the same as above, and the sloping road is upward and steep.

The control unit sets the open/close drive voltage at "reference voltage–$\alpha$" (steps S55, S59 and S60) when the states of those flags are the same as above, and the sloping road is downward and gentle. The same sets the open/close drive voltage at "reference voltage–$\beta$" (steps S55, S59 and S61) when the states of those flags are the same as above, and the sloping road is downward and steep.

The control unit sets the open/close drive voltage at reference voltage (step S53) when the flat road flag is set (step S54) or the upward or downward sloping-road flag is not set (step S62).

When the setting of the open/close drive voltage is complete, the control unit controls the power switch element 88, the polarity reversing circuit 89, and the motor select circuit 90 so as to turn the open/close motor 54 in the closing direction (step S63).

Subsequently, the control unit controls the number of revolutions of the open/close motor 54 through the control of the power switch element 88 so that the slide door 3 is moved at a proper speed in the closing direction (step S64).

Through the control, the control unit detects if something to obstruct the movement of the slide door 3 is caught by the door (step S65). During the control, if the control unit detects that the slide door 3 reaches the full close position or the half-latch position (step S66), it stops the open/close motor 54 through the power switch element 88 (step S67), and controls the clutch drive circuit 91 to declutch the electromagnetic clutch 56 and to thereby remove the mechanical coupling of the open/close motor 54 with the drive pulley 55 (step S68). At this point, the control process ends.

If an obstacle is caught by the door (step S65), the control unit causes the polarity reversing circuit 89 to turn the open/close motor 54 in the reverse direction (step S69). If it is detected that the slide door moves to reach the full close position (step S70), the control unit causes the power switch element 88 to stop the open/close motor 54 (step S67), and it declutches the electromagnetic clutch 56 to decouple the open/close motor 54 from the drive pulley 55 (step S68), and ends the control process.

The step S65 to detect as to whether or not an obstacle is caught by the door may be substantially the same as in the step S30. The step S66 to detect the position of the slide door 3 may be realized by monitoring the position count value N with its initial value of the full close position of the slide door 3.

Manual/Automatic Select Control

When the slide door control unit 7 detects that the slide door 3 is moved by manual, the open/close control system selectively shifts its control mode to an automatic opening mode or an automatic door closing mode. This selective control, or a manual/automatic select control, will be described with reference to FIG. 14. The slide door control unit 7 monitors a period count value T when the open/close motor 54 is standstill, and when the door moving speed exceeds a manual recognition speed, the manual/automatic select control starts.

A step to avoid a mistaken recognition of the manual is executed (step S80). In this step, the slide door control unit 7 checks if a period count value T of four successive periods, stored in the period registers 1 to 4, goes below a fixed value, viz., the door speeds during those four periods are all higher than the manual recognition speed. If the answer is NO (the door speeds are lower than the manual recognition speed), the control unit judges that the manual door operation is not carried out.

If the answer is YES, the control unit judges whether the door moving direction is an opening direction or a closing direction, depending on a phase relationship of the 2-phase speed signals V$\phi$1 and V$\phi$2 (step S81); if it is in the opening direction, the control unit judges that the door is manually opened (step S82); and if it is in the closing direction, the control unit judges that the door is manually closed (step S83).

Then, the control unit controls the power switch element 88, polarity reversing circuit 89 and motor select circuit 90 in accordance with the result of the judgement, to thereby turn the open/close motor 54 in the opening or closing direction (step S84). At this time, the electromagnetic clutch 56 is still in an off state, and hence the open/close motor 54 idly turns.

In the next step S85, the control unit checks if the manual door speed is lower than a preset rapid speed; if the former is lower than the latter, the control unit checks if the manual door speed is lower than a preset rapid speed (step S86); if the former is higher than the latter, the control unit repeats the sequence of steps S85 to S87 till a fixed time elapses (step S87). This step is provided for confirming that the manual operation of the slide door 3 continues.

After the fixed time elapses, the control unit checks if the door speed is higher than a preset half-clutch speed (step S88). If the answer is YES (the door speed is higher than the preset speed), the control unit controls the electromagnetic clutch 56 through the clutch drive circuit 91 to couple the open/close motor 54 with the drive pulley 55 in a half-clutch state (step S89). By so doing, the door speed is gradually varied to approach to the number of revolutions of the motor, thereby to lessen a mechanical impact created when the open/close motor 54 is coupled, at a dash, with the drive pulley 55 where the door speed is high.

If the fixed time elapses and the door speed diminishes to below the half-clutch speed (steps S90 and S91), the control unit controls the electromagnetic clutch 56 through the clutch drive circuit 91 to couple the open/close motor 54 with the drive pulley 55 in a full clutch state (step S92). The subsequent process is the same as of the automatic door opening or closing control. If the moving direction of the door is the opening direction (step S28, FIG. 11), the control unit executes the process subsequent to the step S28. If it is the closing direction (step S63, FIG. 13), the control unit executes the process subsequent to the step S63 (step S93).

If the door speed by manual is higher than the rapid speed (step S85), the control unit judges that the vehicle is stopping on a flat road (step S94). If it is a flat road, the control unit stops the open/close motor 54 (step S95) in order that a rapid closing or opening operation is preferentially carried out (step S95), and ends the control process.

If the vehicle is on a slope, the control unit executes the process subsequent to the step S87 and shifts its control to an automatic control in order to prevent the slide door 3 from rapidly moving by its weight.

If the door speed by manual is lower than the manual recognition speed (step S86), the control unit judges that the vehicle is stopping on a flat road (step S96). If it is on the flat road, the control unit judges that the manual operation is stopped, and stops the open/close motor 54 (step S95), and ends the control process.

If the vehicle is on a sloping road, and the slide door 3 is moved in the closing direction on the upward sloping road or in the opening direction on the downward sloping road (steps S97, S98), the control unit judges that the slide door 3 is moved resisting its weight and then the door speed is reduced, and executes the process subsequent to step S86. In other cases, the control unit judges that the manual operation is stopped, and stops the open/close motor 54 and ends the control process.

Other Modifications

Figure 12:
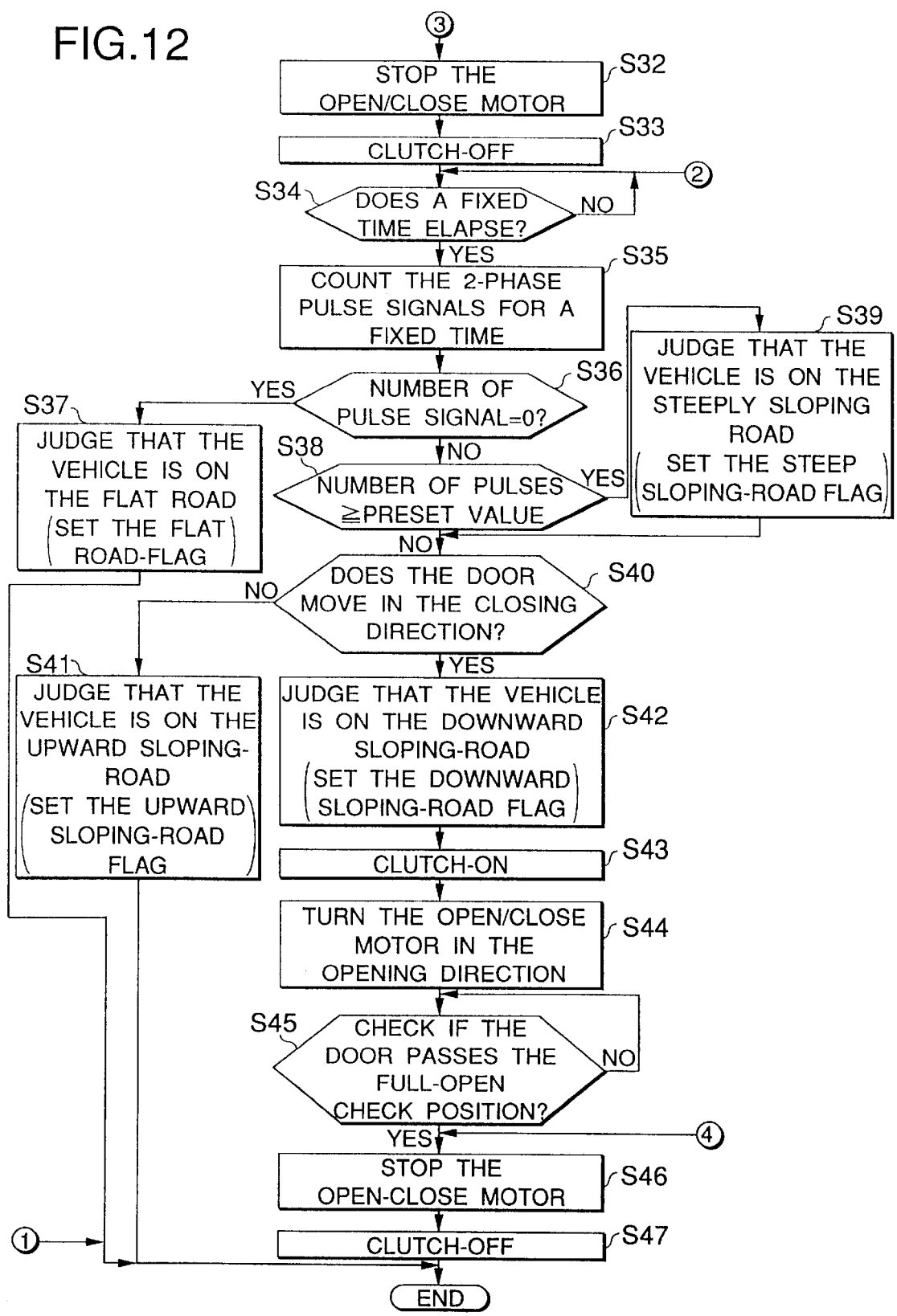
FIG. 12 is a flow chart showing the second half of the process of an automatic door opening control.

FIG. 15 shows a flow chart showing a modification of the automatic door opening control shown in FIG. 12. In this control, when the slide door 3 reaches the before full-open check position during the automatic door opening control, an acceleration of the slide door 3 is detected by using a period variation of a pulse signal derived from the rotary encoder 60, and an inclination of the vehicle at a position where the vehicle stops is obtained.

In the modification, the control unit detects that the slide door 3 reaches the before full-open check position and stops the open/close motor 54 (step S32); the control unit decouples the open/close motor 54 from the drive pulley 55 by the electromagnetic clutch 56 (step S33); it calculates an average acceleration a for a fixed period of time by using the pulse periods of the pulse signals $\phi 1$ and $\phi 2$ (steps S34, S35a); and it calculates an inclination $\theta$ by using a function $F(\alpha)$ of the obtained acceleration $\alpha$ (step S35b).

More specifically, a door speed $\underline{v}$=A/T (where A: distance corresponding to one pulse, T: pulse period). If the pulse period and the door speed are known, the calculating of a rate of change of the door speed will produce an acceleration $\alpha$ of the door. A force F that acts in parallel with the surface of a slope is $$F=m(d^2x/dt^2)=mg\ \sin\theta-\mu mg\ \cos\theta$$

$$\alpha=g\ \sin\theta-\mu g\ \cos\theta$$

where m: gravity
g: acceleration of gravity
$\mu$: coefficient of friction

Therefore, if the acceleration $\alpha$ of the door is known, an inclination $\theta$ can be obtained.

If the inclination $\theta$ is zero (0) (step S36a), the control unit judges that the vehicle is on a flat road and sets a flat-road flag (step S37), and ends the control process.

If the inclination $\theta$ is above a preset value (step S38a), the control unit judges that the vehicle is on a steep sloping road and sets a steep sloping road flag (step S39). The process subsequent to the step S39 is the same as shown in FIG. 12, and no further explanation will be given.

FIG. 16 shows a flow chart showing another modification of the automatic door opening control shown in FIG. 12. In this control, when the slide door 3 reaches the before full-open check position during the automatic door opening control, a distance the door moves and a door speed at that time are detected by using the number of pulses of a pulse signal output from the rotary encoder 60, and an inclination of the vehicle at a position where the vehicle stops is obtained by using the detection results.

In the automatic door opening control, the control unit detects that the slide door 3 reaches the before full-open check position and stops the open/close motor 54 (step S32); the control unit decouples the open/close motor 54 from the drive pulley 55 by the electromagnetic clutch 56 (step S33); when the number of pulses of the pulse signal reaches a preset value L (step S34a), it calculates a door speed $\underline{v}$ at that time by using the pulse period (step S35c); and it calculates an inclination $\theta$ by using a function F(v, L) of the obtained door speed $\underline{v}$ and the preset value L.

$$F=m(d^2x/dt^2)=mg\ \sin\theta-\mu mg\ \cos\theta$$

Thence, the door speed $\underline{v}$ when a moving distance of the door=L is $$v=\sqrt{\{2\ g(\sin\theta-\mu\cos\theta)L\}}$$

Therefore, if the moving distance L and the door speed $\underline{v}$ at that position are known, one can know an inclination $\theta$.

If the inclination $\theta$ is zero (0) (step S36a), the control unit judges that the vehicle is on a flat road and sets a flat-road flag (step S37), and ends the control process.

If the inclination $\theta$ is above a preset value (step S38a), the control unit judges that the vehicle is on a steep sloping road and sets a steep sloping road flag (step S39). The process subsequent to the step S39 is the same as shown in FIG. 12, and no further explanation will be given.

FIG. 17 shows a flow chart showing yet another modification of the automatic door opening control shown in FIG. 12. In this control, when the slide door 3 reaches the before full-open check position during the automatic door opening control, a door speed and a distance the door moves are detected by using the a pulse signal output from the rotary encoder 60, and an inclination of the vehicle body at a position where the vehicle stops is obtained by using the detection results.

In the automatic door opening control, the control unit detects that the slide door 3 reaches the before full-open check position and stops the open/close motor 54 (step S32); the control unit decouples the open/close motor 54 from the drive pulley 55 by the electromagnetic clutch 56 (step S33); it calculates a door speed v after a preset time t (step S35e); and it calculates an inclination θ of the vehicle body by using a function F(v, t) of the obtained door speed v and the preset time t (step S35f).

$$F=m(d^2x/dt^2)=mg\,\sin\theta-\mu mg\,\cos\theta$$

Hence, the door speed v after the preset time t is $$v=gt(\sin\theta-\mu\cos\theta)$$

Therefore, if the door speed v after the preset time t is known, one can know an inclination θ.

If the inclination θ is zero (0) (step S36a), the control unit judges that the vehicle is on a flat road and sets a flat-road flag (step S37), and ends the control process.

If the inclination θ is above a preset value (step S38a), the control unit judges that the vehicle is on a steep sloping road and sets a steep sloping road flag (step S39). The process subsequent to the step S39 is the same as shown in FIG. 12, and no further explanation will be given.

In the above-mentioned embodiments, the detection of an inclination of the vehicle body is carried out at the before full-open check position when the open/close control system is in the automatic door opening control mode. It is evident that it may be carried out at any position on the moving path of the slide door for opening and closing.

As seen from the foregoing description, the motor is temporarily stopped when the opening and closing operations of the slide door is under control, and the electromagnetic clutch is instantaneously turned off to allow the slide door to be movable. In this state, a movement of the slide door caused by its weight is observed, and a vertical inclination of the vehicle body with respect to the axial direction of the vehicle body is detected on the basis of the result of the door movement observation.

The movement of the door by its weight may be detected by utilization of a sensor or device, e.g., a rotary encoder for detecting door moving speed and door position. Therefore, there is no need of using the sensor designed exclusively for its sensing.

The inclination information of the vehicle body is used for opening and closing the slide door (mounted on the vehicle body side) by the drive motor in accordance with an inclination of the vehicle body.

What is claimed is:

1. An open/close control system, for a vehicle slide door mounted on a side of a vehicle body and movable in one of an opening direction and a closing direction, comprising:
    a drive source;
    an opening/closing mechanism adapted to move said slide door in one of said opening direction and said closing direction;
    clutch means for transmitting a drive force of said drive source to said opening/closing mechanism;
    movement signal generating means adapted to detect a movement of said slide door caused by a gravitational force acting on said slide door and to generate an output signal in response to an amount of movement of said slide door in one of said opening direction and said closing direction; and
    slide door control means for controlling a drive force to be transmitted to said opening/closing mechanism by controlling said drive source and said clutch means, said slide door control means receiving said output signal from said movement signal generating means and increasing power supplied to said opening/closing mechanism in response to increased opening/closing force due to the angle of inclination of a vehicle.

2. The open/close control system according to claim 1, in which said movement signal generating means comprises an encoder adapted to rotate in a first direction corresponding to said opening direction of said slide door and adapted to rotate in a second direction corresponding to said closing direction of said slide door, and said movement signal generating means further comprises a pulse generator adapted to generate said output signal so that said output signal includes two-phase pulse signals derived from said encoder.

3. The open/close control system according to claim 2, in which said slide door control means increases power based on an inclination of said vehicle, at a position where said vehicle stops, by counting a number of pulses of said output signal for a fixed time.

4. The open/close control system according to claim 2, in which said slide door control means increases power based on an inclination of said vehicle, at a position where said vehicle stops, by calculating an acceleration of said slide door by use of a period variation of said output signal.

5. The open/close control system according to claim 1, wherein when said output signal indicates that said slide door is moved in said opening direction in response to said gravitational force, said slide door control means judges that said vehicle is on an upward slope, wherein when said output signal indicates that said slide door is moved in a closing direction in response to said gravitational force, said slide door controls means judges that said vehicle is on an downward slope, and wherein when said output signal indicates that said slide door is not moved in response to said gravitational force, said slide door control means judges that said vehicle is on a flat road.

6. The open/close control system according to claim 1, in which said slide door control means increases power based on an inclination of said vehicles at a position where said vehicle stops, by calculating, from said output signal, one of a distance said slide door moves and a door speed at that time and a moving time of said slide door and a door speed at that time.

7. A vehicle having an open/close control system for determining an inclination of an axis of said vehicle relative to a horizontal comprising:
    a vehicle body having a side and an axis;
    a slide door mounted on said side of said vehicle body, said slide door being movable in one of an opening direction and a closing direction in response to a driving force provided by a motor and transmitted through at least a clutch and a cable; and
    an open/close control system mounted on at least one of said vehicle body and said slide door, said open/close control system including:
        a slide door control unit configured to receive a plurality of input signals, analyze said plurality of input signals to determine a desired operating state of said motor, and outputting corresponding control signals to at least said motor; and an encoder configured to generate output signals representative of an amount of movement of said slide door in one of said opening direction and said closing direction;

wherein, during one of an opening operation and a closing operation of said slide door, said slide door control unit stops said motor from supplying said driving force and utilizes said output signals from said encoder to determine at least one of a velocity component of said slide door, an acceleration component of said slide door, and a change in a direction of movement of said slide door, and wherein said slide door control unit is adapted to use said at least one of a velocity component of said slide door, an acceleration component of said slide door, and a change in a direction of movement of said slide doors to determine an inclination of said axis of said vehicle body relative to a horizontal.

8. An open/close control system according to claim 7, wherein said encoder is configured to generate a first output signal and a second output signal out of phase with respect to one another, wherein said slide door control unit determines a direction of movement of said slide door in one of said opening direction and said closing direction by comparing a phase relationship between said first output signal and said second output signal.

9. An open/close control system according to claim 8, wherein said slide door control unit determines said velocity component of said slide door by counting a number of said output signals generated by said encoder over a fixed time period.

10. An open/close control system according to claim 8, wherein said slide door control unit determines said acceleration component of said slide door by measuring a period variation of said output signals generated by said encoder.

11. An open/close control system, for a vehicle slide door mounted on a side of a vehicle and movable in one of an opening direction and a closing direction, comprising:

a drive source;

an opening/closing mechanism adapted to move said slide door in one of said opening direction and said closing direction;

a clutch which transmits a drive force of said drive source to said opening/closing mechanism;

a movement signal generator adapted to detect a movement of said slide door caused by a gravitational force acting on said slide door and to generate an output signal in response to an amount of movement of said slide door in one of said opening direction and said closing direction; and a slide door controller which controls a drive force transmitted to said opening/closing mechanism by controlling said drive source and said clutch, said slide door controller receiving said output signal from said movement signal generator and increasing power supplied to said opening/closing mechanism in response to increased opening/closing force due to the angle of inclination of the vehicle.

12. An open/close control system according to claim 11, wherein said movement signal generator comprises an encoder adapted to rotate in a first direction corresponding to said opening direction of said slide door and adapted to rotate in a second direction corresponding to said closing direction of said slide door, and wherein said movement signal generator further comprises a pulse generator adapted to generate said output signal so that said output signal includes two-phase pulse signals derived from said encoder.

13. An open/close control system according to claim 12, wherein when said output signal indicates that said slide door is moved in said opening direction in response to said gravitational force, said slide door controller judges that said vehicle is on an upward slope, wherein when said output signal indicates that said slide door is moved in a closing direction in response to said gravitational force, said slide door controller judges that said vehicle is on an downward slope, and wherein when said output signal indicates that said slide door is not moved in response to said gravitational force, said slide door controller judges that said vehicle is on a flat road.

14. An open/close control system according to claim 12, in which said slide door controller increases power based on an inclination of said vehicle, at a position where said vehicle stops, by counting a number of pulses of said output signal for a fixed time.

15. An open/close control system according to claim 12, in which said slide door controller increases power based on an inclination of said vehicles at a position where said vehicle stops, by calculating an acceleration of said slide door by use of a period variation of said output signal.

16. An open/close control system according to claim 11, in which said slide door controller increases power based on an inclination of said vehicle, at a position where said vehicle stops, by calculating, from said output signal, one of a distance said slide door moves and a door speed at that time and a moving time of said slide door and a door speed at that time.

\* \* \* \* \*